United States Patent
Bram et al.

(10) Patent No.: US 8,397,748 B2
(45) Date of Patent: Mar. 19, 2013

(54) CHECK VALVE HAVING TWO SEATS

(75) Inventors: Kenneth Bram, Huntington, NY (US); Francis J. Martin, Huntington, NY (US)

(73) Assignee: Ausco, Inc., Port Washington, NY (US)

( * ) Notice: Subject to any disclaimer, the term of this patent is extended or adjusted under 35 U.S.C. 154(b) by 937 days.

(21) Appl. No.: 11/938,428

(22) Filed: Nov. 12, 2007

(65) Prior Publication Data
US 2009/0120514 A1    May 14, 2009

(51) Int. Cl.
*F16K 31/12* (2006.01)
(52) U.S. Cl. ............ 137/494; 137/538; 137/516.25
(58) Field of Classification Search .......... 137/538, 137/516.25, 516.27, 512.2, 494, 508
See application file for complete search history.

(56) References Cited

U.S. PATENT DOCUMENTS

| | | | |
|---|---|---|---|
| 354,835 A * | 12/1886 | Korting | 48/180.1 |
| 718,228 A * | 1/1903 | Strandberg | 73/333 |
| 2,675,021 A * | 4/1954 | Allin | 137/536 |
| 3,508,568 A * | 4/1970 | Kowalski et al. | 137/116.3 |
| 4,836,240 A * | 6/1989 | Elliott | 137/493 |
| 5,482,077 A * | 1/1996 | Serafin | 137/516.25 |
| 5,875,815 A | 3/1999 | Ungerecht et al. | |
| 6,374,853 B1 | 4/2002 | Callies | |
| 6,708,952 B2 | 3/2004 | Brennecke et al. | |
| 2006/0196553 A1 * | 9/2006 | Kane | 137/538 |

OTHER PUBLICATIONS

International Search Report dated Jan. 16, 2009 for patent No. PCT/US/08/83007.

* cited by examiner

*Primary Examiner* — Kevin Lee
*Assistant Examiner* — Macade Brown
(74) *Attorney, Agent, or Firm* — F. Chau & Associates, LLC (57) ABSTRACT

A valve includes a body, a cavity in the body, and a check valve formed in the cavity. The check valve includes a poppet having a first end and a second end, and a first seat and a second seat, wherein the first seat is formed at the first end, the second seat is formed at the second end, and a diameter of the second seat is greater than a diameter of the first seat.

23 Claims, 7 Drawing Sheets

CHECK VALVE HAVING TWO SEATS

BACKGROUND OF THE INVENTION

1. Technical Field

The present disclosure relates to a check valve, and, more particularly, to a hydraulic check valve having two seats.

2. Discussion of the Related Art

Check valves are mechanical devices used for controlling fluid flow in a system, such as a hydraulic circuit. The fluid may be, for example, a liquid or gas, such as oil or steam. Check valves control flow of the fluid in one direction, and include an inlet opening through which the fluid enters, and an outlet opening through which the fluid exits the check valve. The check valve may be used in a system for hydraulic controls, such as in the aerospace industry.

Check valves may operate automatically in a system, whereby the check valve is opened by a minimum upstream pressure caused by the fluid flow. This minimum pressure is referred to as the check valve cracking pressure. A check valve may be designed to open at a predetermined cracking pressure.

A check valve may include a spring bearing against a poppet, which provides a force on the poppet to maintain the check valve in the closed position. Once the cracking pressure is achieved, the poppet is unseated and opens, further compressing the spring. When the pressure of the flow traveling through and on the check valve decreases, for example, to less than the cracking pressure, the check valve closes to prevent further flow through the valve, and also to prevent backflow, that is, reverse flow back to the fluid source. The check valve may be installed between the fluid source and an actuator driven by the fluid flow to control the flow of the fluid between the source and the actuator.

The hydraulic system in which the check valve operates can include a relief valve. The relief valve is an over-pressure pathway designed to relieve excess pressure in the circuit, for example, excess pressure on the actuator, caused by an impact on the actuator or equipment failure. When the relief valve opens, fluid is permitted to flow through the relief valve to, for example, a hydraulic tank, so that excess pressure in the system can be relieved. Like the check valve, a relief valve poppet opens at a predetermined cracking pressure to divert fluid through the over-pressure pathway, and will re-seat upon the pressure reaching the valve's re-seating pressure. The relief valve can include a spring bearing against the poppet, which provides a force on the poppet to maintain the relief valve in the closed position.

Unwanted fluid leakage may occur in areas where the check valve poppet meets the valve body. In order to prevent this leakage, an O-ring seal can be positioned at the point of leakage. However, there is unwanted friction between the check valve poppet and the O-ring seal.

The packing seal introduces additional hysteresis which may cause the poppet to exceed its maximum cracking pressure, and excessive pressure drop at rated flow. Also, the poppet may not reseat causing excessive leakage in the reverse direction.

Therefore, a need exists for a check valve design that prevents unwanted leakage, and also prevents unwanted friction on the check valve poppet.

SUMMARY OF THE INVENTION

Embodiments of the present invention provide a check valve having two seats to prevent fluid leakage and friction on the check valve poppet.

A valve, in accordance with an embodiment of the present invention, comprises a body, a cavity in the body, and a check valve formed in the cavity. The check valve comprises a poppet having a first end and a second end, and a first seat and a second seat, wherein the first seat is formed at the first end, the second seat is formed at the second end, and a diameter of the second seat is greater than a diameter of the first seat.

The second seat may be formed around an outer wall of the poppet. The cavity may have a first diameter and a second diameter greater than the first diameter, and the diameter of the second seat may be substantially equal to the second diameter. The diameter of the first seat may be less than or equal to the first diameter. The outer diameter of the poppet may be substantially equal to the first diameter.

The valve may further comprise a wall around the cavity, wherein the wall includes a stepped portion between the first and second diameters, and the second seat rests on the stepped portion when the poppet is in a closed position. The stepped portion may be formed at a substantially 90 degree angle, and may be formed by a wedge. The second seat may create a seal with the stepped portion. The poppet may be spring-loaded by a spring contacting a side of the second seat.

The outer wall may include a first portion and a second portion having substantially the same or the same diameter as the first portion, wherein the first portion is formed closer to an inlet of the valve, and the second portion is formed closer to an outlet of the valve. The first portion may include a plurality of raised portions formed thereon, wherein the plurality of raised portions have a larger diameter than the first and second portions. The second seat may be formed around the second portion.

The plurality of raised portions may be spaced apart from each other at a predetermined interval around the circumference of the poppet such that the remaining exposed first portion forms a channel between each raised portion.

The outer wall may include a plurality of channels, the plurality of channels being positioned in front of the second seat, and being spaced apart from each other around a circumference of the poppet.

The valve may further comprise a relief valve formed adjacent the check valve, wherein the first seat rests on a portion of the relief valve when the check valve is in a closed position.

A check valve, in accordance with an embodiment of the present invention, comprises a poppet having an inlet and an outlet, and a first seat and a second seat, wherein the first seat is formed at the inlet, the second seat is formed adjacent the outlet, and a diameter of the second seat is greater than a diameter of the first seat.

The poppet may be positioned in a cavity having a first diameter and a second diameter greater than the first diameter, and the diameter of the second seat may be substantially equal to the second diameter. The diameter of the first seat may be less than or equal to the first diameter, and the outer diameter of the poppet may be substantially equal to the first diameter.

The cavity may comprise a wall around the cavity, wherein the wall includes a stepped portion between the first and second diameters, and the second seat rests on the stepped portion when the poppet is in a closed position.

A check valve, in accordance with an embodiment of the present invention, comprises a poppet having an inlet end and an outlet end, and a first seat and a second seat, wherein a diameter of the first seat is different from a diameter of the second seat.

The first seat may be formed at the inlet end, the second seat may be formed at the outlet end, and a diameter of the first seat may be greater than a diameter of the second seat, or a diameter of the second seat may be greater than a diameter of the first seat.

The first and the second seat may be formed at the inlet end, and a diameter of the first seat may be smaller than a diameter of the second seat.

The second seat may be downstream from the first seat, the first seat may be downstream from the second seat, or the first and second seats may be positioned at the same point along a length of the fluid stream.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the present invention now will be described more fully hereinafter with reference to the accompanying drawings. This invention may, however, be embodied in many different forms and should not be construed as limited to the embodiments set forth herein.

Turning now to FIGS. 1-6, a hydraulic valve 10 includes a check valve 20 and a relief valve 40. The check valve 20 includes a check valve poppet 22 in the shape of a cylinder having an inlet portion 25, a middle portion 27 and an outlet portion 29. The poppet 22 includes first and second wall portions 23A and 23B. The first wall portions 23A alternate with raised wall portions 23. The raised portions 23 have a larger diameter than the first and second wall portions 23A and 23B, such that the portions 23A form channels in the raised portion 23. The second wall portion 23B is formed at substantially the same diameter as the first wall portions 23A.

The check valve poppet 22 includes a first seat 24 at the inlet portion 25 and a second seat 26 adjacent the outlet portion 29. The diameter $d_s$ of the second seat 26 is greater than the diameter $d_f$ of the first seat 24. The diameters $d_s$ and $d_f$ are measured from the longitudinal center-line of the poppet 22.

The check valve poppet 22 contacts a spring 28, which keeps the check valve poppet 22 seated until the fluid flowing into the valve 10 exerts a predetermined cracking pressure on the first and second seats 24 and 26. The spring exerts an axial force on the check valve poppet 22 and the retainer 14.

A fluid, such as oil, flowing into the valve 10 through an inlet 12 and/or 13 (e.g., as shown by arrow FLOW in FIG. 1), applies pressure to the check valve poppet 22 at the first seat 24. In addition, due to the presence of the alternating first wall portions or channels 23A, the fluid is also allowed to flow to the second seat 26 and apply pressure thereon. The presence of the channels 23A and resulting pressure on the second seat 26 enables the poppet to open faster than if the raised wall portion and channels 23A were not present. When the applied pressure reaches a cracking pressure, the check valve poppet 22 is unseated to compress the spring 28 and open the check valve to permit flow of the fluid sequentially through inlet, middle and outlet portions 25, 27 and 29 of the check valve poppet 22 to an outlet 14 of the valve 10. The outlet 14 may lead to, for example, an actuator to actuate, for example, hydraulic controls.

The cracking pressure is calculated based on the seat effective area ($A_{eff}$). For example, the area of each seat is calculated according to $A_f=\pi(d_f/2)^2$ and $A_s=\pi(d_s/2)^2$ and the seat effective area is calculated by the following equation:

$$A_{eff}=A_s-A_f \quad (1)$$

where $A_s$ is the area of the second seat, $A_f$ is the area of the first seat and $A_{eff}$ is the seat effective area. The cracking pressure is then calculated according to the following equation:

$$P_{crack}=F_{spring}/A_{eff} \quad (2)$$

where $P_{crack}$ is the check valve cracking pressure, $F_{spring}$ is the installed force of the spring 28, and $A_{eff}$ is the seat effective area. For example, according to an embodiment of the present invention, when the diameter ($d_f$) of the first seat 24 is 0.340 inches, the diameter ($d_s$) of the second seat 26 is 0.555 inches, and the installed force ($F_{spring}$) of the spring 28 is 1.0 lb, then $P_{crack}$ is equal to 1.00/0.1511=6.6 PSI. Accordingly, the larger diameter ($d_s$) of the second seat 26 allows for a lower cracking pressure ($P_{crack}$) than if the diameter ($d_s$) were equal to or less than the diameter ($d_f$) of the first seat 24. Once the pressure of the fluid falls below the cracking pressure ($P_{crack}$), the spring 28 urges the poppet 22 to be re-seated, so as to prevent further flow through the check valve 20, including backflow. It is to be understood that diameters of the first and second seats ($d_f$, $d_s$) and the installed spring force ($F_{spring}$) may be modified to alter the cracking pressure ($P_{crack}$) based on design constraints.

Figure 1:
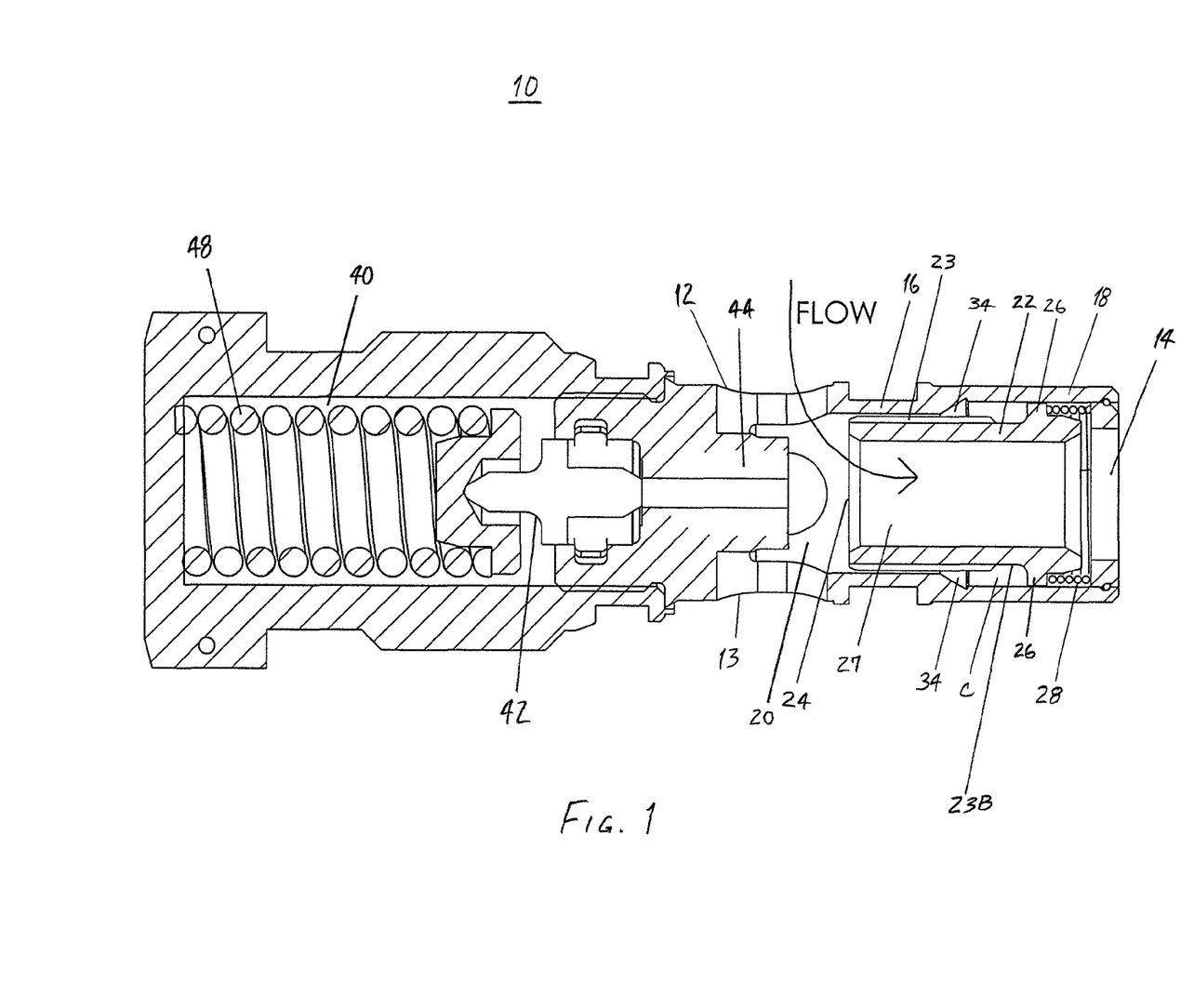
FIG. 1 is a cross-sectional view of a valve including a check valve in the open position, according to an embodiment of the present invention.
Figure 2:
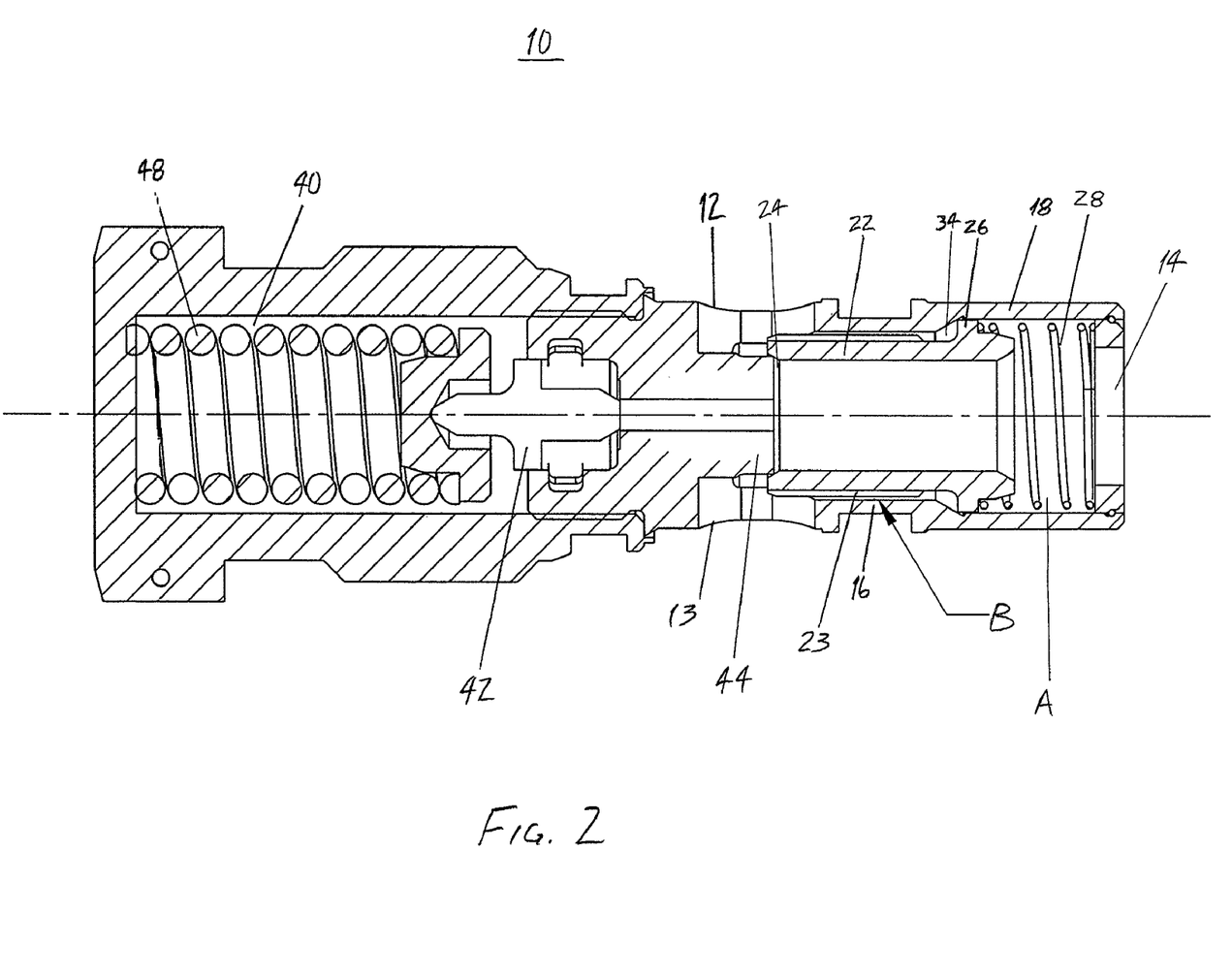
FIG. 2 is a cross-sectional view of a valve including a check valve in the closed position, according to an embodiment of the present invention.
Figure 3:
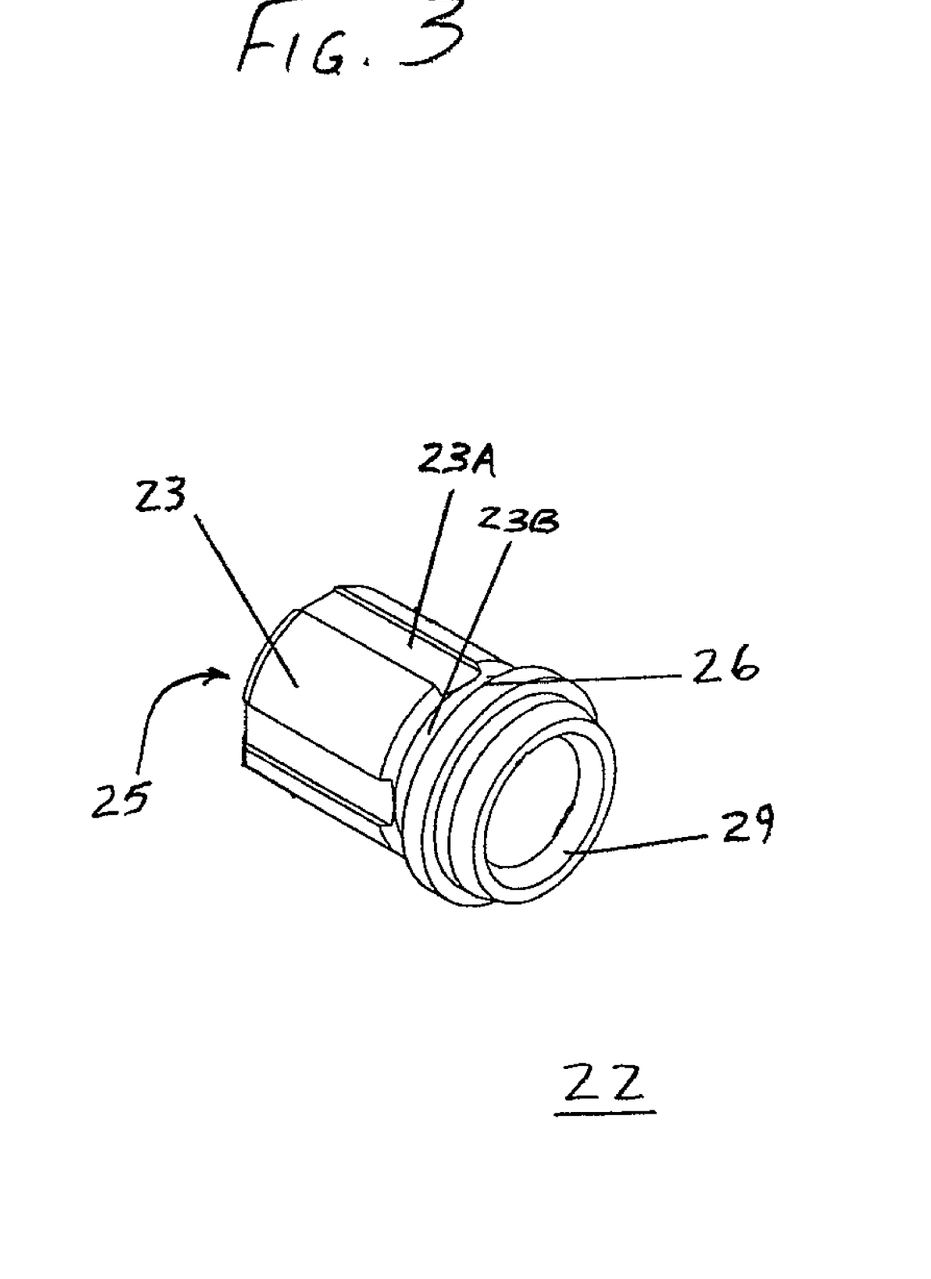
FIG. 3 is a perspective view of a check valve poppet, according to an embodiment of the present invention.
Figure 4:
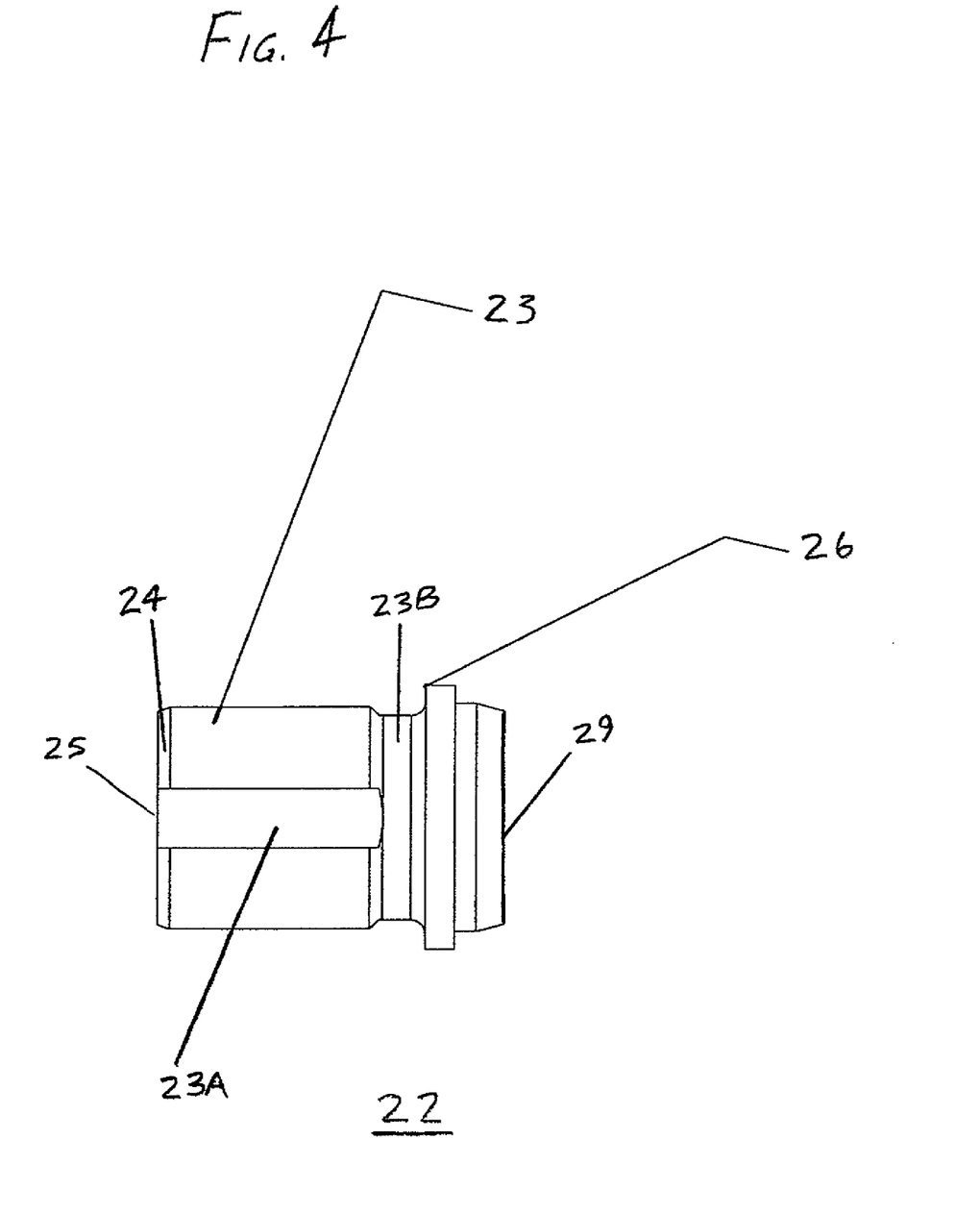
FIG. 4 is a left side view of a check valve poppet, according to an embodiment of the present invention.
Figure 5:
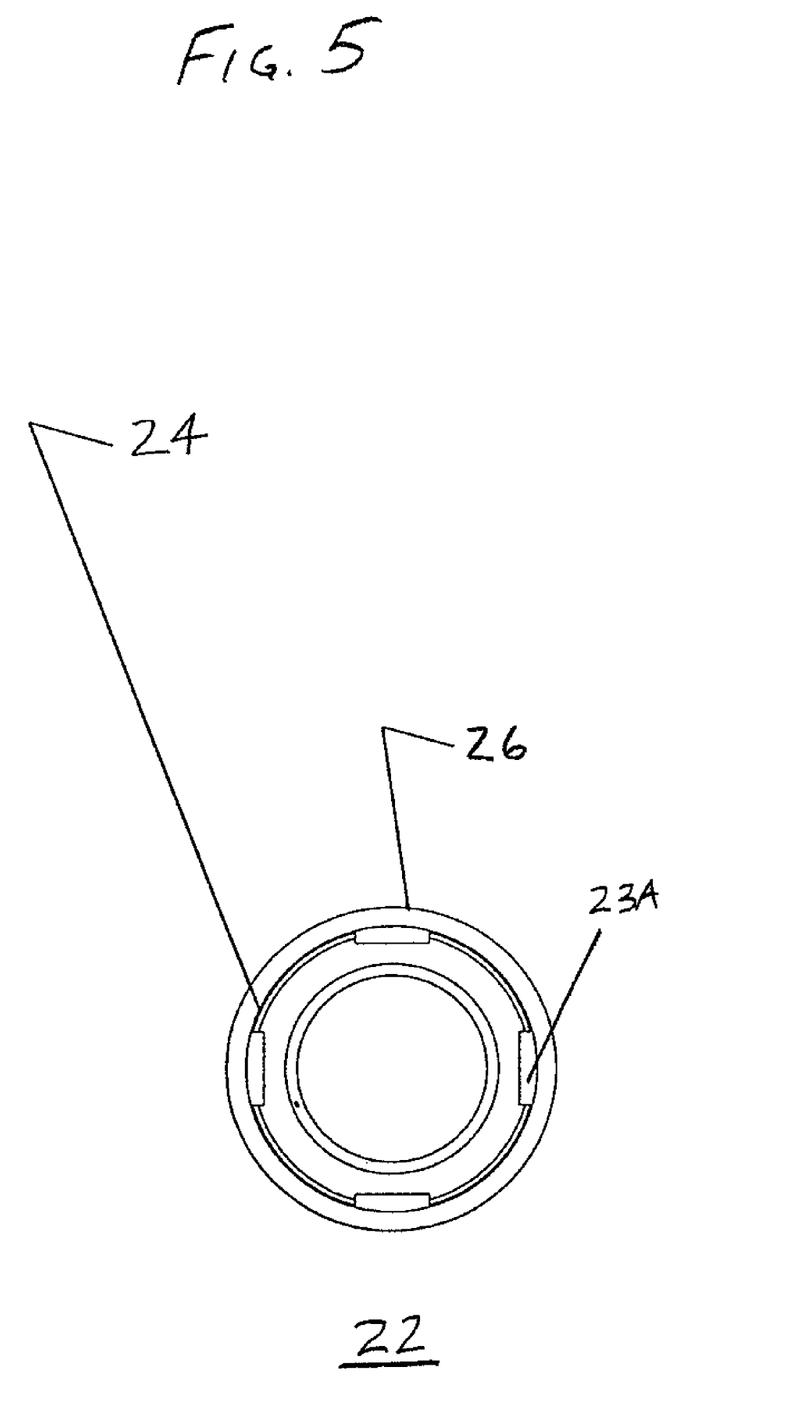
FIG. 5 is a front view of a check valve poppet, according to an embodiment of the present invention.
Figure 6:
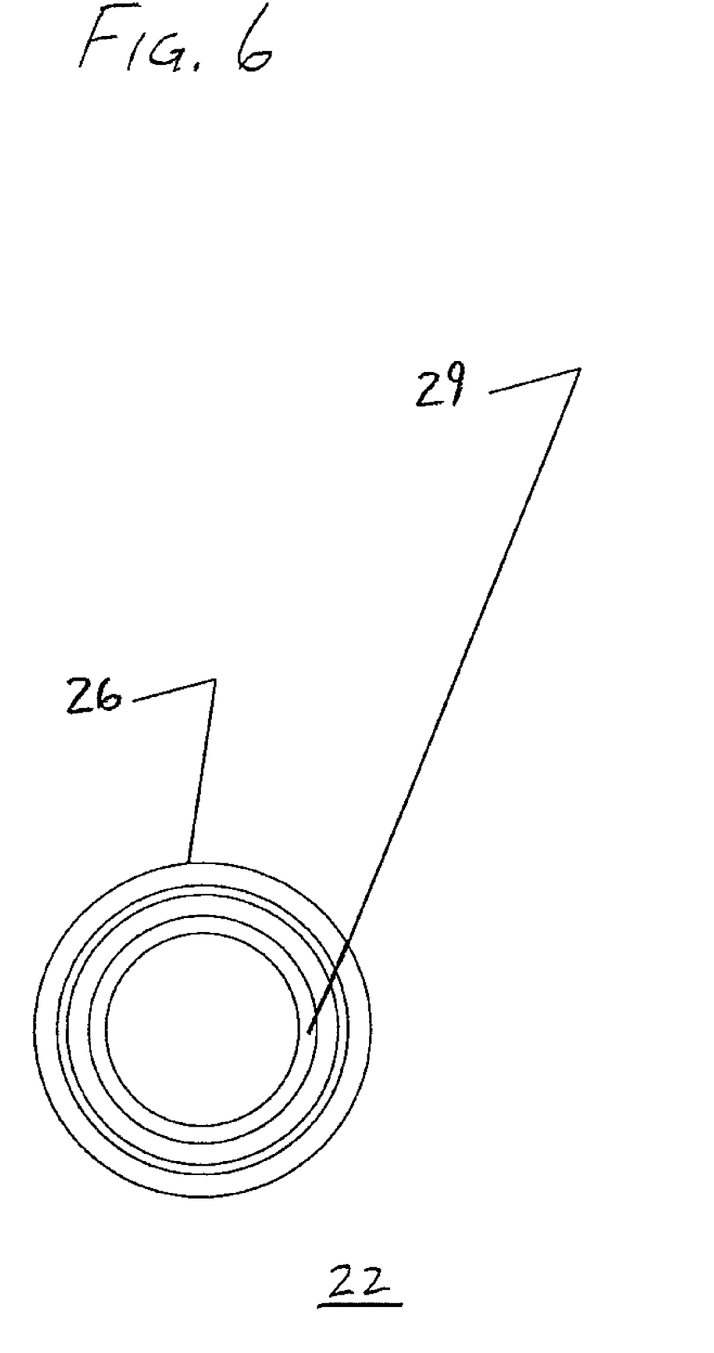
FIG. 6 is a rear view of a check valve poppet, according to an embodiment of the present invention.

Referring to FIG. 2, the first seat 24 rests on a body portion 44 of the relief valve 40 when in the closed position to create a first seal. In the closed position, the second seat 26, formed around the second wall portion 23B of the poppet 22, meets with wall 18 of the valve 10 and rests on wedge portion 34 to create a second seal. As can be seen in FIGS. 1 and 2, the cavity of the valve surrounded by wall 18 has a larger diameter than the cavity of the valve 10 surrounded by wall 16. The poppet 22 is configured to have a diameter to fit in the cavity of the valve 10 having the smaller diameter, and the second seat is formed around the second wall portion 23B to have a diameter substantially equal to the larger diameter of the cavity of the valve 10 in the area surrounded by wall 18. A wedge portion 34 having, for example, a triangular shape, can be positioned on and attached to an inclined portion of the valve wall between walls 16 and 18, to create a substantially 90 degree stepped portion of the wall between the smaller and larger diameter areas. Alternatively, the wall of the valve 10 can be molded to include the substantially 90 degree stepped portion between the smaller and larger diameter sections.

The second seal prevents leakage of fluid from an area A in the larger diameter portion between the outlet portion 29 and the outlet 14 of the valve 10 to an area B in the smaller diameter portion between a raised wall portion 23 of the poppet 22 and the wall 16 of the valve 10. Further, when in the open position as shown in FIG. 1, the stepped portion and the second seat 26 prevent leakage into area B, from fluid flowing from the area of the compressed spring 28 and/or from the area at or beyond the outlet 14. In addition, when the poppet 22 is in the open position, the area C between the seat 26 and the stepped portion is kept substantially free of back-flowing fluid due to the presence of seat 26.

Figure 7:
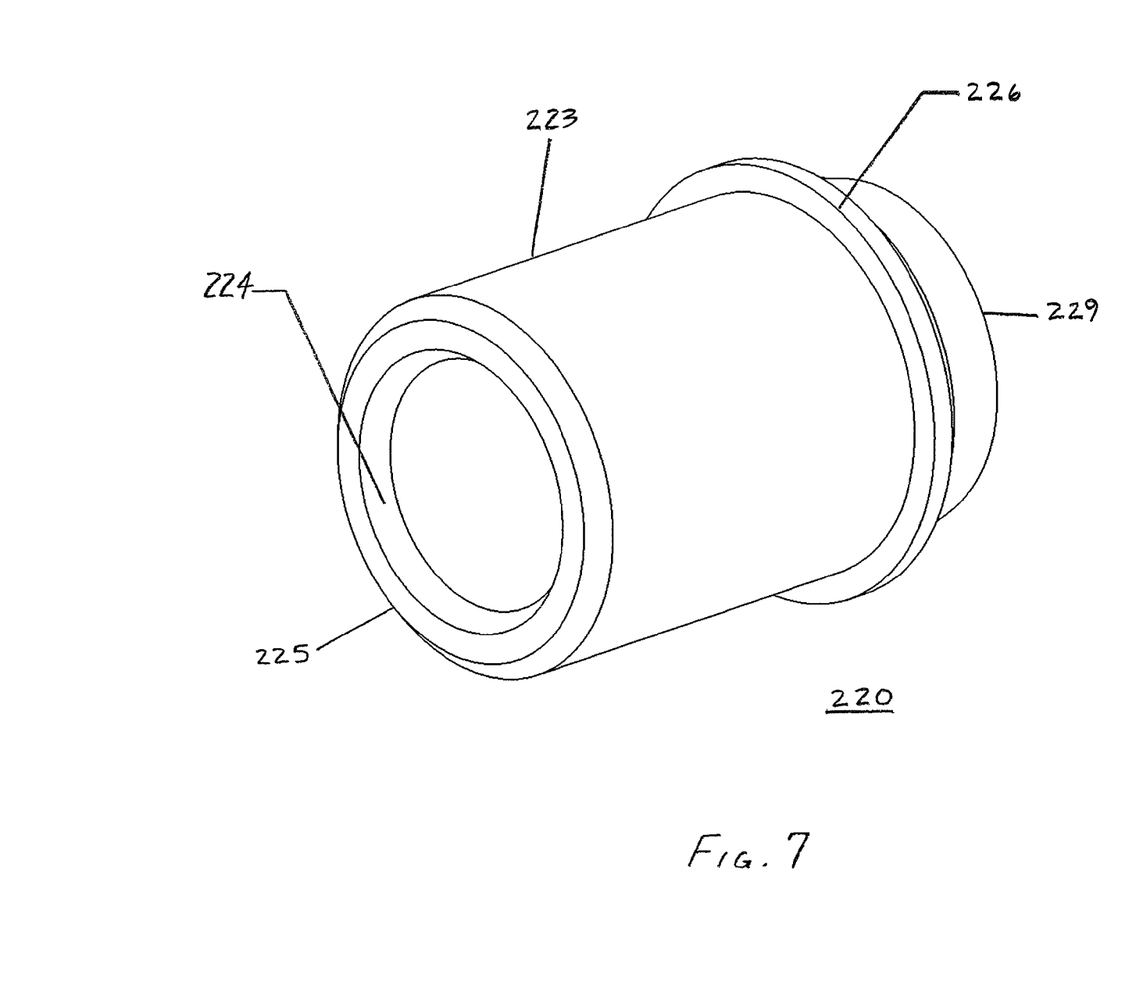
FIG. 7 is a perspective view of a check valve poppet, according to an embodiment of the present invention.

Referring to FIG. 7, an alternative poppet 220 to the poppet 22 is shown. The poppet 220 does not include the wall portions of varying diameter, and, accordingly, does not include the channel portions 23A.

The check valve poppet 220 is in the shape of a cylinder having a wall 223, an inlet portion 225, a middle portion (not labeled, but similar to middle portion 27 of poppet 22) and an outlet portion 229. The poppet 220 includes a first seat 224 at the inlet portion 225 and a second seat 226 adjacent the outlet portion 229. The diameter $d_s$ of the second seat 226 is greater than the diameter $d_f$ of the first seat 224. The diameters $d_s$ and $d_f$ are measured from the longitudinal center-line of the poppet 220.

The check valve poppet 220 contacts a spring 28, which keeps the check valve poppet 220 seated until the fluid flowing into the valve 10 exerts a predetermined cracking pressure on the first seat 224.

A fluid, such as oil, flowing into the valve 10 through an inlet 12 and/or 13 (e.g., as shown by arrow FLOW in FIG. 1), applies pressure to the check valve poppet 220 at the first seat 224. When the applied pressure reaches a cracking pressure, the check valve poppet 22 is unseated to compress the spring 28 and open the check valve to permit flow of the fluid sequentially through inlet, middle and outlet portions 225, 227 and 229 of the check valve poppet 220 to an outlet 14 of the valve 10.

In alternative embodiments, depending on the configuration of the valve body, for example, the size of the cavity and of walls 16 and 18, the first seat 24 or 224 may have a larger diameter than the second seat 26 or 226. In another alternative, both the first and second seats can be located at the same end of the poppet. For example, both the first and second seats can be at the inlet end, with the larger diameter seat downstream from the smaller diameter seat, the smaller diameter seat downstream from the larger diameter seat, or both smaller and larger diameter seats positioned at the same point along a length of the fluid stream.

It is to be understood that the check valve 20, although shown in a valve 10 also having a relief valve 40, is not limited thereto, and may be formed in a hydraulic circuit without a relief valve, and/or with or without any other valve components according to specified design constraints.

As stated above, the relief valve 40 includes a body portion 44. In addition, the relief valve 40 includes a poppet 42 and a spring 48 which holds the poppet 42 in a closed position until a cracking pressure unseats the poppet 42 to compress the spring 48 and open the relief valve 40. Once the fluid pressure decreases to the valve's re-seating pressure, the spring 48 urges the poppet 42 to be re-seated, so as to prevent further flow through the relief valve 40.

Although exemplary embodiments of the present invention have been described hereinabove, it should be understood that the present invention is not limited to these embodiments, but may be modified by those skilled in the art without departing from the spirit and scope of the present invention, as defined in the appended claims.

What is claimed is:
1. A valve, comprising:
   a body;
   a cavity in the body;
   a check valve formed in the cavity, wherein the check valve comprises:
      a poppet having a first end and a second end, and a first seat and a second seat, wherein:
      the first seat is formed at the first end,
      the second seat is formed at the second end,
      a diameter of the second seat is greater than a diameter of the first seat,
      the second seat abuts a wall of the cavity around an entire circumference of the poppet when the poppet is in an open position to create a seal for preventing back-flowing fluid from reaching an area upstream from the second seat, and
      fluid exerting pressure at the first seat enters the valve through at least one same inlet as fluid exerting pressure on the second seat, and
   a relief valve formed adjacent the check valve, wherein the first seat rests on a portion of the relief valve when the check valve is in a closed position.

2. The valve of claim 1, wherein the second seat is formed around an outer wall of the poppet.

3. The valve of claim 2, wherein the cavity has a first diameter and a second diameter greater than the first diameter, and the diameter of the second seat is substantially equal to the second diameter.

4. The valve of claim 3, wherein the diameter of the first seat is less than or equal to the first diameter.

5. The valve of claim 3, wherein the an outer diameter of the poppet is substantially equal to the first diameter.

6. The valve of claim 3, wherein:
   the wall of the cavity includes a stepped portion between the first and second diameters, and
   the second seat rests on the stepped portion when the poppet is in a closed position.

7. The valve of claim 6, wherein the stepped portion is formed at a substantially 90 degree angle.

8. The valve of claim 6, wherein the stepped portion is formed by a wedge.

9. The valve of claim 6, wherein the second seat creates a seal with the stepped portion.

10. The valve of claim 2, wherein the poppet is spring-loaded by a spring contacting a side of the second seat.

11. The valve of claim 2, wherein:
   the outer wall includes a first portion and a second portion having substantially the same or the same diameter as the first portion, the first portion being formed closer to an inlet of the valve, and the second portion being formed closer to an outlet of the valve,
   the first portion includes a plurality of raised portions formed thereon, wherein the plurality of raised portions have a larger diameter than the first and second portions, and
   the second seat is formed around the second portion.

12. The valve of claim 11, wherein the plurality of raised portions are spaced apart from each other at a predetermined interval around the circumference of the poppet such that the remaining exposed first portion forms a channel between each raised portion.

13. The valve of claim 2, wherein the outer wall includes a plurality of channels, the plurality of channels being positioned in front of the second seat, and being spaced apart from each other around a circumference of the poppet.

14. A check valve, comprising:
   a poppet having an inlet and an outlet, and a first seat and a second seat, wherein:
      the first seat is formed at the inlet, the second seat is formed adjacent the outlet and around an outer wall of the poppet, wherein the outer wall includes a plurality of channels, the plurality of channels being positioned in front of the second seat, and being spaced apart from each other around a circumference of the poppet, a diameter of the second seat is greater than a diameter of the first seat the poppet is positioned in a cavity, the second seat abuts a wall of the cavity around an entire circumference of the poppet when the poppet is in an open position to create a seal for preventing back-flowing fluid from reaching an area upstream from the second seat, and fluid exerting pressure at the first seat enters the valve through at least one same inlet as fluid exerting pressure on the second seat.

15. The check valve of claim 14, wherein the poppet is spring-loaded by a spring contacting a side of the second seat.

16. The check valve of claim 14, wherein the cavity has a first diameter and a second diameter greater than the first diameter, and the diameter of the second seat is substantially equal to the second diameter.

17. The check valve of claim 16, wherein the diameter of the first seat is less than or equal to the first diameter.

18. The check valve of claim 16, wherein the an outer diameter of the poppet is substantially equal to the first diameter.

19. The check valve of claim 16, wherein:

the wall of the cavity includes a stepped portion between the first and second diameters, and the second seat rests on the stepped portion when the poppet is in a closed position.

20. The check valve of claim 19, wherein the stepped portion is formed at a substantially 90 degree angle.

21. The check valve of claim 19, wherein the stepped portion is formed by a wedge.

22. The check valve of claim 19, wherein the second seat creates a seal with the stepped portion.

23. A valve, comprising:

a body;

a cavity in the body, wherein the cavity has a first diameter and a second diameter greater than the first diameter, and a wall of the cavity includes a stepped portion between the first and second diameters;

a check valve formed in the cavity, wherein the check valve comprises:

a poppet having a first end and a second end, and a first seat and a second seat, wherein:

the first seat is formed at the first end, the second seat is formed at the second end and is formed around an outer wall of the poppet, a diameter of the second seat is greater than a diameter of the first seat and is substantially equal to the second diameter, the second seat abuts a wall of the cavity around an entire circumference of the poppet when the poppet is in an open position to create a seal for preventing back-flowing fluid from reaching an area upstream from the second seat, the second seat rests on the stepped portion when the poppet is in a closed position, and fluid exerting pressure at the first seat enters the valve through at least one same inlet as fluid exerting pressure on the second seat.

* * * * *